United States Patent [19]

Blaha

[11] Patent Number: 4,593,683
[45] Date of Patent: Jun. 10, 1986

[54] MEDICAL EXAMINATION INSTRUMENT WITH HEADBAND SUPPORT

[75] Inventor: Erich Blaha, Essingen, Fed. Rep. of Germany

[73] Assignee: Carl-Zeiss-Stiftung, Heidenheim on the Brenz, Fed. Rep. of Germany

[21] Appl. No.: 676,072

[22] Filed: Nov. 29, 1984

[30] Foreign Application Priority Data

Dec. 3, 1983 [DE] Fed. Rep. of Germany ... 8334797[U]

[51] Int. Cl.⁴ .......................... A61B 1/06; F21L 15/14
[52] U.S. Cl. ...................................... 128/23; 362/106; 362/804
[58] Field of Search ............................ 128/21, 22, 23; 362/105, 106

[56] References Cited

U.S. PATENT DOCUMENTS

| | | | |
|---|---|---|---|
| 902,216 | 10/1908 | Drager | 362/106 |
| 2,213,118 | 8/1940 | Bowers | 128/21 X |
| 3,086,516 | 4/1963 | Scott | 128/23 |
| 4,449,797 | 5/1984 | Kocher et al. | 351/205 |

FOREIGN PATENT DOCUMENTS

| | | | |
|---|---|---|---|
| 3020750 | 8/1982 | Fed. Rep. of Germany | |
| 2305684 | 10/1976 | France | 362/105 |
| 369448 | 3/1932 | United Kingdom | 362/105 |

*Primary Examiner*—William H. Grieb
*Attorney, Agent, or Firm*—Stonebraker, Shepard & Stephens

[57] ABSTRACT

A headband to be worn on the head of a person making an examination, with an examination instrument such as an observation unit and an illuminating unit supported from the headband so as to be adjacent the eyes of the examining person. A counterweight on the rear of the headband counterbalances some of the weight of the examination instrument at the front, and makes the headband sit more evenly and comfortably on the wearer's head. The counterweight may contain a power pack, such as rechargeable batteries, providing power for the illuminating unit through a cord extending along one side of the headband.

1 Claim, 1 Drawing Figure

U.S. Patent     Jun. 10, 1986     4,593,683
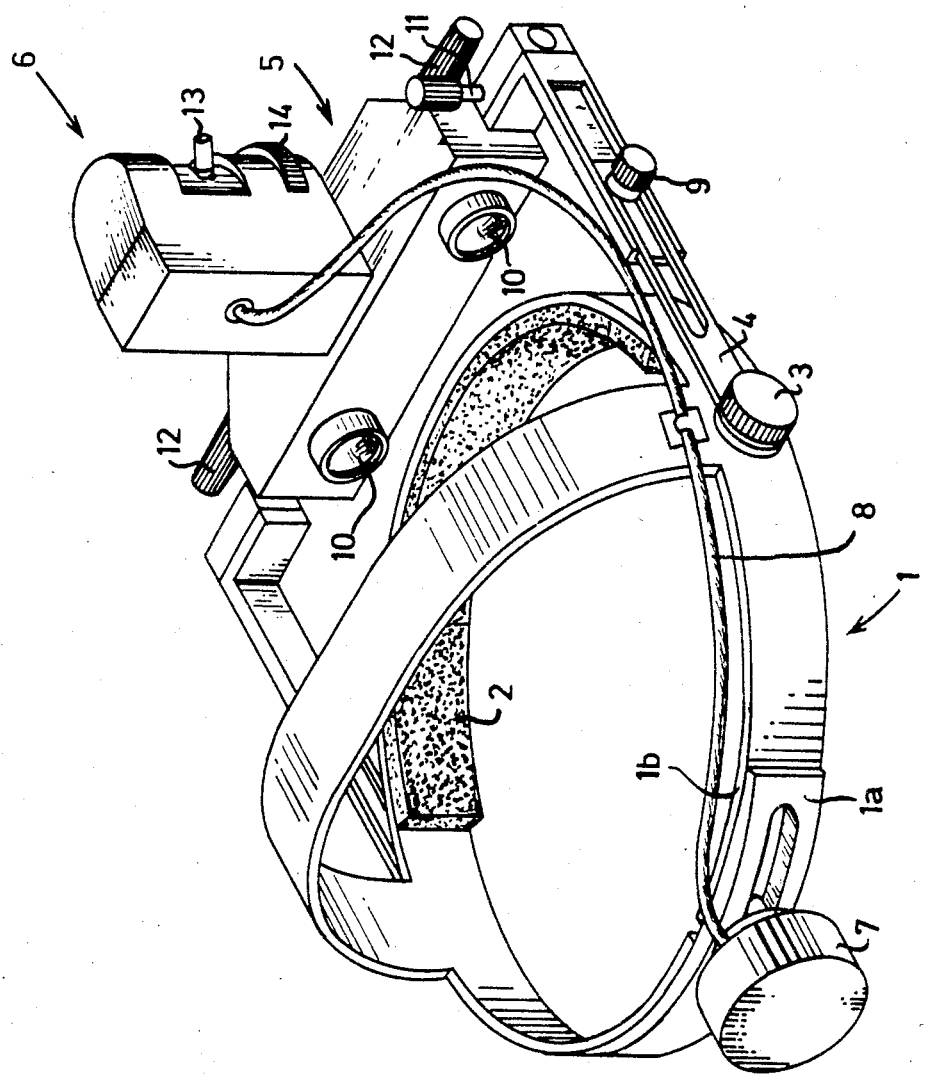

MEDICAL EXAMINATION INSTRUMENT WITH HEADBAND SUPPORT

This invention relates to an examination instrument supported by a headband. In the medical field in general, and particularly in the practice of ophthalmology, it is convenient to mount various examination instruments on a headband or an eyeglass frame worn by the examining physician or technician. This leaves the hands of the examiner free to perform other tasks, e.g., touching the patient as part of the examination, or writing note of what is found in the examination, rather than having to hold the examination instrument in the hand. The examination instrument thus worn by the examiner frequently includes an optical observation instrument and a companion illuminating instrument.

An example of the prior construction is Federal Republic of Germany Pat. No. 30 20 750 of Foerster et al., patented Aug. 19, 1982, and the corresponding U.S. Pat. No. 4,449,797 of Kocher and Foerster, granted May 22, 1984, showing a binocular ophthalmoscope mounted on an eyeglass frame to be worn by the examining physician.

In known instruments of this general kind, power packs or batteries (usually rechargeable) must be provided for supplying electricity to the illuminating instrument, and a connecting cable is required between the power supply and the illuminating instrument worn on the head. This connecting cable frequently exerts considerable pulling force on the instrument worn by the user, and is very disturbing, particularly in the case of instruments which require accurate positioning with respect to the eyes of the user. Furthermore, the weight of the instrument worn on the user's head must be taken up either by the nose of the user or by pressure on the head at the place of attachment of the instrument to the headband, so that the user may experience discomfort on his head after wearing the instrument for a short time.

The object of the invention is to provide a headband support for an examination instrument which is both more comfortable and more convenient than the supports of the prior art.

This object is achieved by providing a counterweight at the rear of the headband, whereby the downward weight of the instrument at the front of the headband is partly balanced so that the headband sits more comfortably on the head. Preferably the counterweight forms the operating head of a fastening screw or clamping screw which serves to fasten the overlapping rear ends of the headband, which are slidable over each other in order to adjust the headband to the size of the head of the wearer. Also, the counterweight is preferably formed as a container for a power supply unit from which an electric supply cord may run along one side of the headband to the illuminating instrument at the front of the headband, thereby eliminating a separate cord from a separate power source, eliminating the discomfort of the downward pull of such a cord, and making the apparatus more convenient in that there is no cord to interfere with movements of the hand or arm of the wearer.

Another advantage of the invention is that the power supply unit may be a rechargeable battery unit designed for cooperation with an automatically operating charger which becomes automatically effective when the headband is placed on a special support when not being worn. Thus the battery unit is kept charged and is ready for use at all times.

BRIEF DESCRIPTION OF THE DRAWING

The single view is a perspective view of a headband according to a preferred embodiment of the invention.

DETAILED DESCRIPTION

Referring now to the drawing, the headband is shown in general at 1. The rear ends 1a and 1b of the band overlap each other and slide over each other to adjust the size of the band to the size of the head of the wearer. The band, which may be of metal or plastic material, is provided with a layer of padding 2, at least in the region of the forehead of the wearer, and the padding may extend around the full inner perimeter of the band or any desired part thereof.

By means of fastening screws 3 at the sides of the band (the temple region of the wearer's head) a yoke 4 may be attached to the band. The forward end of the yoke carries any desired observation instrument, such as the conventional observation unit 5 and illuminating unit 6.

The overlapping adjustable ends 1a and 1b of the headband are held together in adjusted position by a clamping screw 7. According to the invention, the operating head of this screw is developed as a counterweight for the observation unit 5 and illuminating unit 6, or for whatever observation instrument may be mounted at the front of the headband. With this counterweight, the headband sits more evenly on the head, with less tendency of the forward part to sag, and with greater comfort to the wearer.

According to a further feature of the invention, the counterweight 7 is hollow and is formed as a battery case, containing batteries, preferably rechargeable batteries, for furnishing power to the illuminating unit 6. An electric cord or cable 8 runs from the battery container 7 along one side of the headband and its yoke to the illuminating unit 6. The weight of the batteries constitutes part of the weight of the counterweight. Of course if the member 7 is not formed as a battery case, then it would be made heavier.

The details of construction of the yoke 4 and of the observation instrument units 5 and 6 are immaterial so far as the present invention is concerned, and may be varied widely. Merely as typical examples of known constructions which may be used with the invention, there is shown a yoke which is adjustable in length and can be held in its adjusted position by clamping screws 9, only one of these being seen in the drawing, the other one on the opposite side being hidden from view, as is the opposite one of the screws 3. The yoke is also adjustable in width, and held in adjusted position by the clamping screw 11. The observation unit 5 has binocular eyepieces 10, and optical elements within the unit are adjusted by an adjusting knob 12. The illuminating unit 6 has adjusting members 13 and 14, for adjusting diaphragms or other parts which, as above stated, are immaterial to the present invention.

What is claimed is:

1. A headband to be worn on the head of a person making an examination, said headband having a rear part including two members overlapping each other and slidable relative to each other to adjust the size of the headband to the size of the head of said person, means for attaching to a forward part of said headband an examination instrument including an electric illuminating unit, and clamping screw means at said rear part of said headband, said clamping screw means including a relatively large head manually engageable to tighten or loosen said clamping screw means, said head forming a case for holding a power supply unit for said illuminating unit, the weight of said head and of a power supply unit contained therein serving as a counterweight on said rear part of said headband to tend to counteract a forward tilting tendency caused by weight of said examination instrument.

* * * * *